Sept. 1, 1964 W. F. CLAUSSEN 3,147,433
APPARATUS FOR MEASURING HIGH TEMPERATURE AND
PRESSURE UTILIZING THERMOCOUPLES
Filed Aug. 21, 1961 3 Sheets-Sheet 1
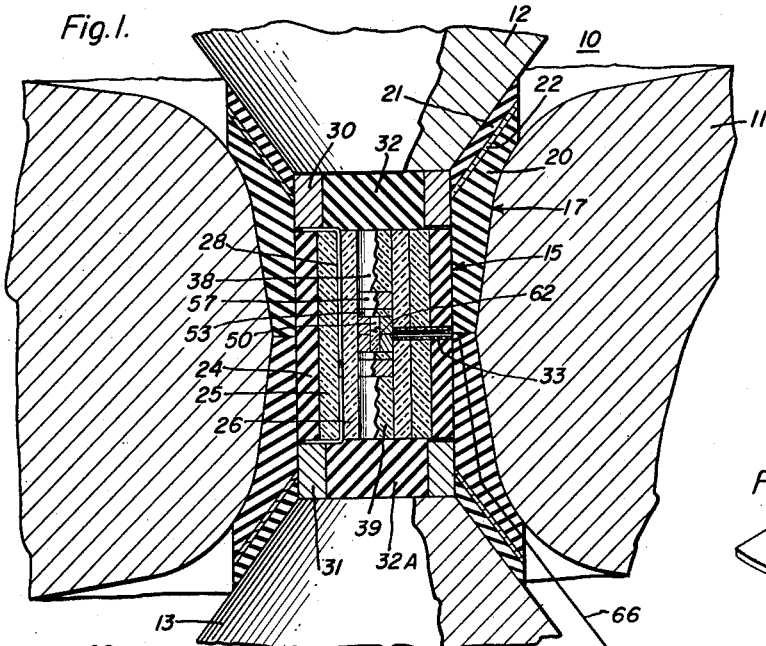
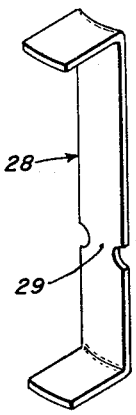
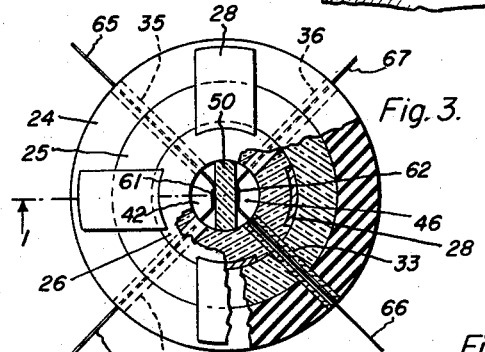
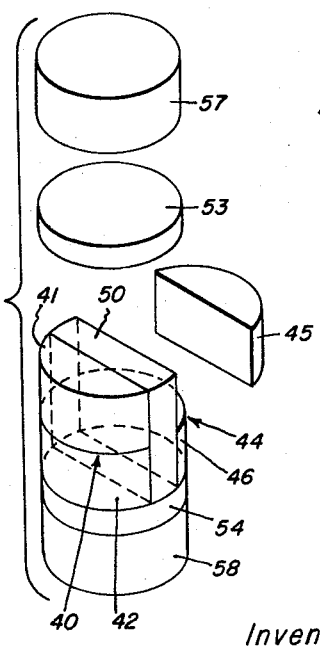
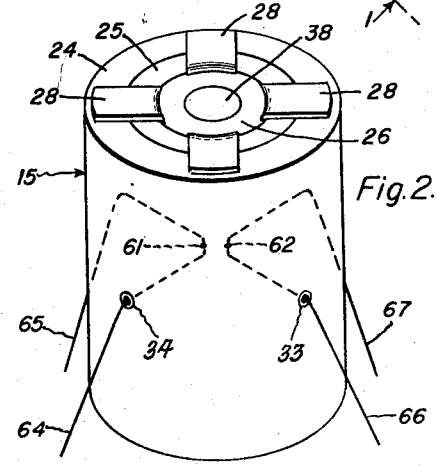
Inventor:
Walter F. Claussen,
by His Attorney.

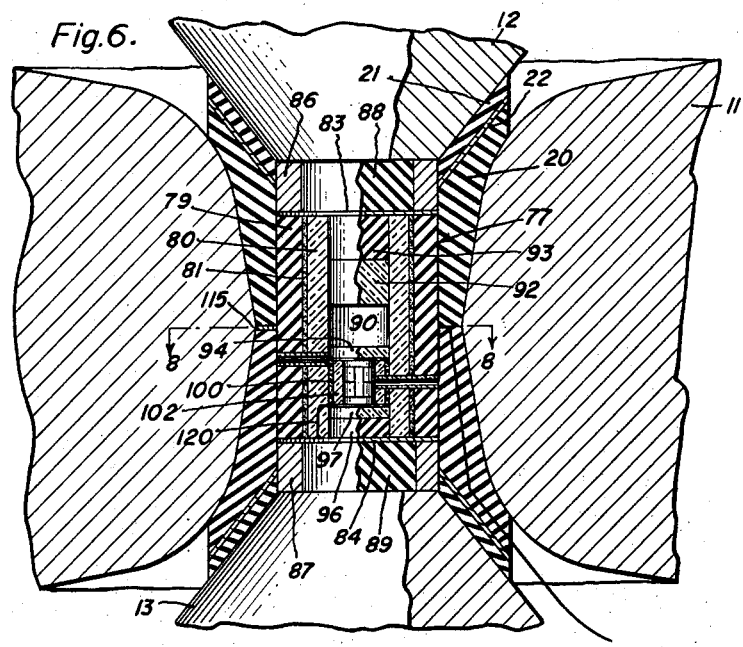
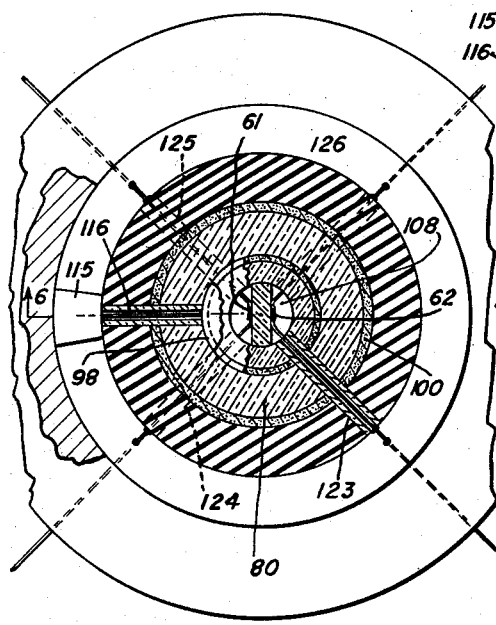
Fig. 6.
Fig. 7.
Fig. 8.
Inventor:
Walter F. Claussen,
by His Attorney.

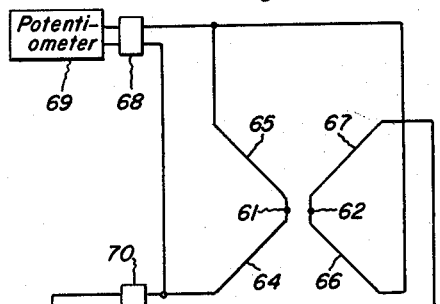
Fig. 9.
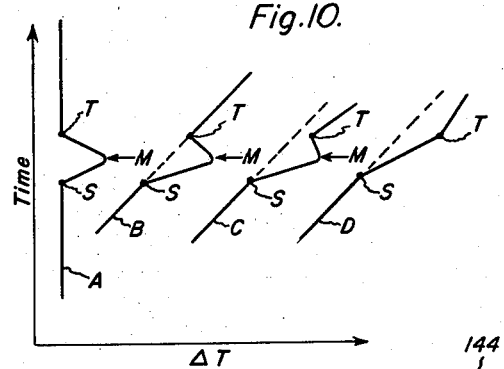
Fig. 10.
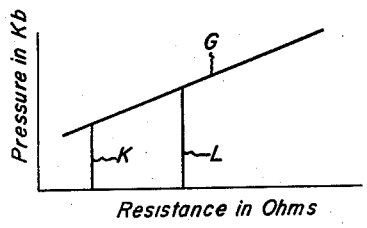
Fig. 14.
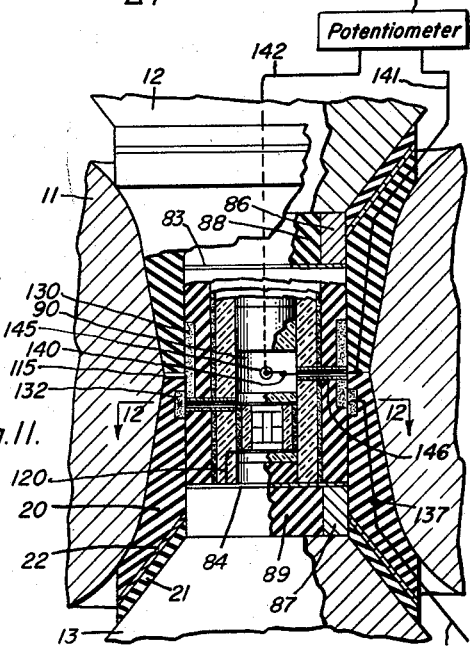
Fig. 11.
Fig. 12.
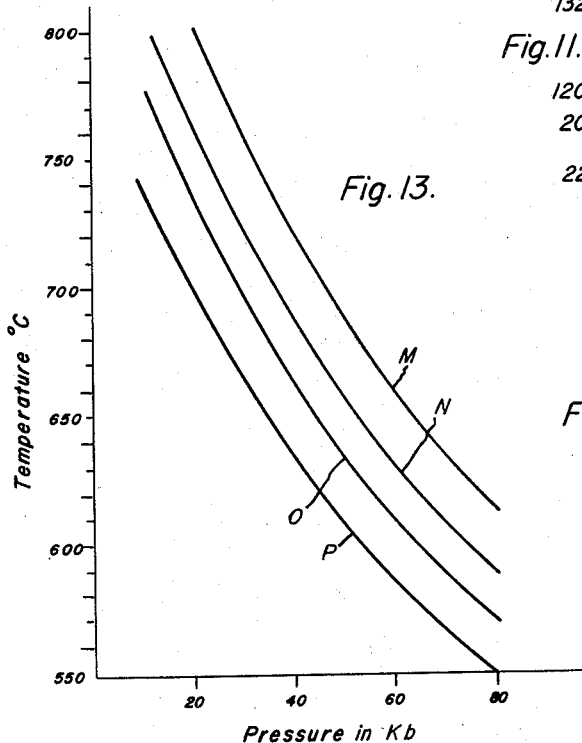
Fig. 13.
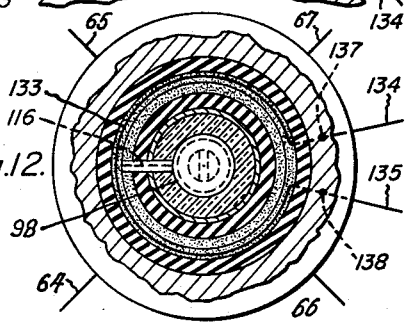
Inventor:
Walter F. Claussen,
by *His Attorney.*

United States Patent Office 3,147,433
Patented Sept. 1, 1964

3,147,433
APPARATUS FOR MEASURING HIGH TEMPERATURE AND PRESSURE UTILIZING THERMOCOUPLES
Walter F. Claussen, Scotia, N.Y., assignor to General Electric Company, a corporation of New York
Filed Aug. 21, 1961, Ser. No. 132,979
8 Claims. (Cl. 324—71)

The present invention relates generally to the measuring and testing art and is more particularly concerned with novel apparatus for testing materials under various temperature and pressure conditions and for measuring extreme temperatures and pressures.

There has for some time existed a generally recognized need for a reliable method or means for ascertaining optimum conditions for processes carried out at temperatures and pressures far removed from the normal ranges. This need has been acute in certain operations involving crystal nucleation and growth and having as a primary objective the production of large crystals. Thus, while the range of temperature and pressure in a process of this kind may be comparatively broad if crystal size is of secondary interest and the maximum yield of crystalline material in the minimum of time is the main objective, close control of these conditions is essential for consistently high yields of large crystals.

Prior attempts of those skilled in the art to provide an answer to this problem have generally been directed along the lines of absolute temperature and pressure measurement. Also, these efforts have generally been concerned with the direct determination or measurement of reaction mixture temperature and pressure. Furthermore, while a measure of success along these lines has been achieved, a satisfactory answer to this problem has not, to the best of my knowledge, previously been devised. The absolute temperature and pressure measurement approaches have, for example, proven satisfactory in intermediate ranges of temperature and pressure but are undependable and in some instances even impossible in ultra-high temperature and pressure processes in which the essential prevailing conditions quickly disable or destroy the critical elements of measuring apparatus.

I have, by virtue of this invention, provided a novel and useful and practical apparatus for measuring temperatures and pressures over the full range of temperature and pressure employed in present commercial operations. Accordingly, the foregoing problem or demand finds a full and complete answer in this invention which opens the way to the consistent production of large crystal bodies in high yields. Moreover, this important new result can be achieved through the use of this invention in processing equipment of presently standard design.

As a further advantage of this invention, the effects of temperature and pressure can be tested with high accuracy over relatively broad ranges on a wide variety of materials and this also can be accomplished without significant modification of existing standard commercial high-pressure equipment.

This invention has the further important advantage that the present novel apparatus is not subject to disability or destruction in use even under extreme temperatures and pressures and, in fact, may be used repeatedly in the highest temperature and pressure commercial production equipment. Moreover, there in nothing about the installation of operation of either the present invention apparatus or high pressure-high temperature equipment fitted with this apparatus that is detrimental to this equipment or to the processes carried out therein. The space requirements of this new apparatus within a reaction chamber can be so small as to decrease only negligibly the theoretical crystal-producing capacity of the apparatus.

In its broadest aspects, the present measuring and testing apparatus comprises a body of material having a solid-state phase transformation, means for subjecting that body to conditions causing a solid-state phase transformation to occur in a portion of the body and to progress through the body, and mean for detecting the progression of the phase transformation through the body. This apparatus will also normally, but not necessarily, include vessel means providing a reaction chamber and means for establishing elevated temperatures and pressures within that reaction chamber. The aforesaid body will be disposed in the reaction chamber together with the means for subjecting the body to conditions causing its solid-state phase transformation. As will subsequently be described in more detail, however, means for detecting the progression of the phase transformation through the body will in part be located outside the reaction chamber and outside the vessel means, as well.

It is another special feature of this invention that apparatus may be provided for enabling the control, either manually or automatically, of a high pressure-high temperature reaction. Thus, it is contemplated that a range of temperature and pressure conditions may be established and maintained through the guidance of or under the regulation by apparatus of this invention. In this embodiment, the apparatus includes a first body of metal having a solid-state phase transformation under conditions representing approximately the lower limit of the range, and a second body of metal having such a transformation under conditions representing approximately the upper limit of this range. These two bodies together with the means for sensing the progression of phase transformations through them can readily be incorporated in the apparatus generally described above and set forth in greater detail herebelow. Implicit in this general combination is reaction chamber control means enabling the regulation or adjustment of temperature and pressure conditions within the reaction chamber between the upper and lower limits of pressure and temperature indicated by these first and second bodies. Whether this control means is designed to act automatically in response to signals originating in the first and second bodies, or whether the operation is manual and is carried out by an observer who notes progression of phase transformations through these bodies and is thereby guided in making pressure and/or temperature adjustments, is a matter of choice.

Those skilled in the art will gain a further and better understanding of the present invention from the detailed description set out below taken in conjunction with the drawings accompanying and forming a part of this specification, in which:

FIG. 1 is a fragmentary, vertical sectional view of high pressure equipment incorporating testing and measuring apparatus of this invention;

FIG. 2 is a perspective view of the pressure vessel of FIG. 1;

FIG. 3 is a top plan view of the FIG. 2, vessel parts being broken away in the interest of clarity and the vertical section of FIG. 1 being indicated by the axis 1—1;

FIG. 4 is a perspective view of apparatus of this invention partially exploded to illustrate the structural relationship between components;

FIG. 5 is a perspective view of one of the heater elements of this apparatus;

FIG. 6 is a view similar to FIG. 1 of another high pressure-high temperature apparatus equipped with a preferred form of this invention;

FIG. 7 is an enlarged, fragmentary view of the FIG. 6 assembly;

FIG. 8 is a horizontal sectional view of FIG. 6 apparatus taken on line 6—6 thereof;

FIG. 9 is a wiring diagram of the solid-state phase transformation-sensing system of this invention apparatus;

FIG. 10 is a chart bearing curves representing typical recorder chart patterns traced by the recorder of FIG. 9;

FIG. 11 is a fragmentary vertical sectional view of the FIG. 6 apparatus equipped with auxiliary means of this invention affording control over conditions in the reaction vessel;

FIG. 12 is a horizontal sectional view taken on line 12—12 of FIG. 11;

FIG. 13 is a chart bearing curves illustrating the effect of pressure on solid-state phase transformations in four different bodies; and, FIG. 14 is a chart illustrating in terms of a resistance-pressure curve the calibration of the auxiliary control means of this invention.

In apparatus 10 of FIG. 1, an operational volume is provided or defined by an annular ring or belt 11 and a pair of opposed tapered punches 12 and 13. This apparatus is generally of the type described in patent application Serial No. 810,504, filed May 1, 1959, now abandoned, in the name of Herbert M. Strong and assigned to the assignee of the present case. Accordingly, it will be understood that belt 11 may suitably be reinforced by one or more binding and strengthening rings and that the belt and rings are of very high strength materials. The belt may suitably be of cemented tungsten carbide while the rings will desirably be of high-grade tool steel. Punches 12 and 13 are also of high-strength material such as either cemented tungsten carbide or tool steel and are preferably provided with metal binding or reinforcing rings as in the case of the belt. The volume contained or defined by these elements contains a reaction vessel 15 and a gasket assembly 17.

Gasket assembly 17 comprises upper and lower subassemblies and serves to seal vessel 15 between punches 12 and 13 and belt 11. Since these subassemblies are alike, only the upper gasket assembly will be described in the interest of brevity. The upper assembly comprises three elements, namely thermally electrically insulating gaskets 20 and 21 and an electrically conducting gasket 22 disposed therebetween and thereby insulated from both belt 11 and punch 12. These gaskets are all annular bodies, being of generally frusto-conical shape, and they are formed to fit tightly together and fill the space between opposing surfaces of the belt and punch 12. This gasket assembly and its counterpart below the centerline of FIG. 1 serve several functions including sealing the contents of the operational volume permitting relatively large movement of the punch or punches with respect to the belt and providing electrical insulation between belt 11 and the punches when reaction vessel 15 is subjected to electrical resistance heating.

A variety of materials may be employed in making gaskets 20 and 21. Pyrophyllite, talc, or other thermally and electrically insulating materials are preferred for this purpose, while mild steel which has been hydrogen annealed to substantially maximum softness is preferred as the material from which to make gasket 22.

Reaction vessel 15 includes a cylindrical, thermally and electrically-insulating body 24 suitably of the same material as gaskets 20 and 21. Arranged in nested relationship within cylinder 24 are two alumina cylinders 25 and 26, the end surfaces of which cooperate with the end surfaces of cylinder 24 to define substantially radial planes. Four metal strip heaters 28 (FIG. 5) are disposed lengthwise of the cylindrical vessel and arranged 90° apart. As seen to best advantage in FIG. 2, upper and lower end portions of heaters 28 are turned outwardly (or radially with respect to vessel 15) electrical contact with upper and lower metal rings 30 and 31. Heater 28 is notched in its lower portion to provide a relatively narrow section 29 in which heating effects will be at a maximum so as to produce a temperature gradient in a body to be measured or tested in accordance with this invention. Rings 30 and 31 make contact with a suitable source of electric power (not shown) through tapered punches 12 and 13. A disk-like plug 32 of the same material as gaskets 20 and 21 fills the space within ring 30 and bears against the top surface of vessel 15 and a similar plug 32A is provided in ring 31. Four tubes 33, 34, 35 and 36 are disposed radially within vessel 15, extending through bodies 24, 25, and 26 to provide access for electrical leads to the interior of the reaction vessel. These are of insulating material, suitably alumina, and they are disposed at 90° to each other and spaced between heaters 28, as shown in FIG. 3.

The apparatus of this invention as illustrated in FIG. 4 is disposed as a core within vessel 15. Cylindrical plugs of lava 38 and 39 fitted into the upper and lower portions of inner cylinder 26 of vessel 15 serve to maintain this apparatus in approximately the central portion of the vessel as is apparent in FIG. 1. This apparatus then together with plugs 38 and 39 fills the space within inner cylindrical body 26.

The invention apparatus, as shown in FIG. 4, includes an iron body 40 divided into upper and lower halves and iron-nickel body 44 similarly in two parts 45 and 46. A lava body 50 in a form of plate or block is situated between these metal bodies so as to insulate them thermally and electrically from each other and these several elements together constitute a solid cylindrical body. A relatively thin insulating, disk-like body 53 is disposed as a cap on the top of the metal-lava assembly cylinder and a similar cap 54 is likewise provided at the bottom thereof. The invention apparatus is completed with solid cylindrical metal elements 57 and 58, the purpose of which will subsequently be described in detail.

Thermocouples 61 and 62 are disposed between elements 41 and 42, and 44 and 45, respectively, and leads for these thermocouples extend through the tubes 33, 34, 35 and 36 and through the gasket assembly so that changes in temperature occurring at those locations can be readily detected and measured at a location external to the reaction vessel, as indicated in FIG. 9. Thus, platinum, platinum-rhodium thermocouple 61 has leads 64 of platinum and 65 of platinum-rhodium and thermocouple 62 of the same type has leads of platinum 67 and platinum-rhodium 66. Potentiometer 69 is connected to thermocouple 61 through an ice junction 68 to readout temperature in absolute values at any stage of the operation of this equipment. However, thermocouples 61 and 62, as FIG. 9 indicates, are "bucked" with the plus side of one connected to the plus side of the other so that temperature differences between the thermocouples (i.e. $\Delta T$) is indicated rather than absolute temperature at any stage of operation. A D.C. amplifier 71 is provided to amplify the $\Delta T$ signal and a millivolt recorder 73 serves to indicate and record $\Delta T$ readings over an entire period of operation of this equipment. Amplifier 71 and recorder 73 may be of any suitable conventional types. Leads 64 and 67 are connected to amplifier 71 by copper leads and the junctions of these thermocouple and copper leads are maintained at constant temperature by means of Dewar flask 70. Interposed in the copper lead circuit is means for providing small D.C. bias voltages to this $\Delta T$ thermocouple circuit so that the resultant signal as recorded will be close to zero and be at a favorable part of the recorder chart.

The apparatus of FIGS. 6–8 is generally similar to that of FIGS. 1–5, a principal difference residing in the provision in the FIG. 6 apparatus of a chamber in which high temperature and high pressure processing may be carried out. Accordingly, in the embodiment of this invention, the present apparatus may be used as a monitor for such processing, whereas its primary purpose in the FIG. 1 type of equipment will be for scientific investigation and testing rather than commercial production.

In FIG. 6, a volume is again provided by belt 11 and tapered punches 12 and 13, and a gasket assembly 17 is provided for the purpose described above, being of the form and of the construction previously described herein in detail. Reaction vessel 77, however, is of somewhat different construction from vessel 15, although it may suitably be of approximately the same over-all dimensions. Thus, vessel 77 comprises an outer cylinder 79 of lava, an inner cylinder 80 of alumina, and a relatively thin graphite cylinder 81 disposed between cylinders 79 and 80. Thin metal plate or disk 83 covers the top of cylinder 77 and bearing electrical conducting contact against cylinder 81 so that the latter may perform its function of heating vessel 77 and its contents. A similar disk 84 covers and likewise bears against the bottom surface of cylinder 77. The path for electrical current for resistive heating using heater 81 consists of top punch 12, top current ring 86, top current disk 83, heater 81, bottom current disk 84, bottom current ring 87, and bottom punch 13. The punches may be attached to either an A.C. or a D.C. variable current supply. Space within rings 86 and 87 again is closed and filled by caps of lava 88 and 89, as described in reference to FIG. 1.

The core portion of vessel 77 is designed to provide a reaction chamber 90 at a central location within the vessel. Above the chamber 90, an alumina plug 92 and a lava plug 93 close the space below the opposed surface portion of disk 83. The floor of chamber 90 is provided by the top surface alumina disk 94, which serves as a cover for the apparatus of this invention.

The lower end of the vessel core is closed by a lava plug 96 and another alumina disk 97 of thickness approximating that of disk 94. A thin copper disk 98 (approximately 5 mils thick) is disposed over the upper surface of disk 97 and another similar copper disk 99 is disposed over the lower portion of disk 94 as part of the electric resistance heater system for the monitor unit of FIG. 6. A thin cylinder of graphite 100 of outside diameter approximating the inside diameter of alumina cylinder 80 is disposed with its ends bearing against these disks 98 and 99 and by means to be described, electric current is delivered to cylinder 100 so as to heat the apparatus of this invention comprising this monitor unit.

The internal portion of the monitor unit includes an alumina cylinder 102 nested within and closely fitting cylinder 100 and bearing against opposed surfaces of disks 98 and 99. Assembly 105 is the same as that of FIG. 4, with the exception that metal temperature-equalizing elements 57 and 58 are eliminated. Assembly 105 is accordingly cylindrical and comprises opposed pairs of iron elements 106 and 107, iron-nickel alloy elements and 108 and 109 with an insulating body 110 disposed between them and cooperates with them to provide a regular cylindrical body. Top and bottom cap pieces 112 and 113 complete assembly 105 and fill the space between disks 98 and 99 and the upper and lower ends of the metal elements of this assembly.

Electric current is delivered to heater 100 from a source (not shown) by way of belt 11, belt contact 115 and lead wire 116 extending through reaction vessel 77 in an alumina tube extending through registered openings in cylinders 79, 80 and 81. Lead wire 116 makes contact with upper disk 98 while ground lead wire 120 connects lower disk 99 to disk 84, lower current ring 87 and lower punch 13.

Thermocouple leads for thermocouples 61 and 62 are similarly made through alumina tubes 123, 124, 125 and 126, as described in reference to FIG. 3. The wiring diagram of FIG. 9 serves equally well for the FIG. 7 assembly as for that of FIG. 3, essential differences between these two embodiments of the invention in respect to this feature residing in the manner in which leads 64, 65, 66 and 67 are taken out through gasket assembly 17. As indicated in FIG. 7, each of these lead wires emerges from its radially-disposed alumina tube and is run upwardly between the opposed faces of cylinder 79 and the gasket assembly to the vertical midpoint of the latter where the junction between the upper and lower elements of the gasket assembly is located. The wire then is run radially outwardly a short distance and then is taken out of the apparatus through a groove provided in gasket 20.

Typical curves of charts produced by recorder 73 are illustrated in FIG. 10, ΔT in degrees centigrade (or millivolts) being plotted against time in minutes. Curve A represents an ideal operation in which ΔT remains at a constant finite value during the measuring or testing operation except for the period of time that element 40 of FIG. 1, for example, is undergoing a solid-state phase transformation, that is, from alpha to gamma form. The onset of the phase transformation is indicated at point S and the termination at point T, and the transformation has reached the thermocouple location at the midpoint of the iron element at the maximum at point M. The ΔT readings represented by Curve A are attributable to the fact that the thermal conductivity of the iron body is quite different in the alpha from what it is in the gamma form. The shape of this curve is also attributable to the fact that in accordance with this invention, the temperature at one end of the element is higher than at the other end. The solid-state phase transformation is initiated at the lower, hotter end of part 42 and progressed upwardly to the top of that element and similarly through part 41. Accordingly, ΔT is at a maximum when one-half of the body 40, that is, part 41, is in the alpha form while part 42 is in the gamma form. Iron-nickel alloy body 44 served by thermocouple 62 does not, during the period of this solid-state phase transformation of body 40, undergo any solid-state phase transformation of its own. However, over a lower temperature region, the iron-nickel alloy body 44 would undergo a transformation while the iron body 40 would remain unchanged. This change would also be monitored by the same thermocouple-recorder device as described. It will be understood that solid-state phase transformations of this type are reversible, but with some hysteresis; i.e., a lower temperature is generally required to reverse the transformation than make it proceed in the forward direction. Thus, Curve A is retracted, but at a lower temperature, when the transformation is reversed and is progressing, for example, from the top of body 40 downwardly.

Curves B, C, and D of FIG. 10 represent departures to varying degrees from the idealized conditions of Curve A and hence are more typical of the kinds of curves produced in the ordinary use of the apparatus of this invention. Again, points S, M and T represent the initial stage, the middle stage and the terminal stage of the solid-state phase transformation in one or the other bodies 40 or 44. In the cases of Curves B, C and D, a spurious temperature gradient existed between bodies 40 and 44 and their control parts in the apparatus of FIG. 6 and this gradient increased with the absolute temperature, producing curves sloping to one side. Superimposed upon this slow change of ΔT with temperature was still another type of behavior, arising because of the transformation, which gave the curve a decided shift instead of coming to a maximum and returning to the baseline. The latter situation is exemplified by Curve D. However, for purposes of the present inventon, both in testing and measuring and for special use in monitoring pressure and temperature conditions in production operations, curves such as B, C and, in some instances, those like Curve D represent entirely satisfactory operating circumstances.

The apparatus shown in FIG. 11 corresponds closely to that of FIG. 6, differing primarily in that it incorporates means for sensing, testing, and measuring pressure and changes in pressure in the processing chamber of the apparatus. Accordingly, reference characters of FIG. 6 are applied to corresponding parts of the FIG. 11 apparatus. It will be understood, then, that the FIG. 11 apparatus includes belt 11 upper and lower gasket assemblies including gaskets 20, 21 and 22 and punch 13, upper punch 12 not being shown. So also, there are contact ring 87, filler body 89 and copper contact disk 84, to provide support for reaction vessel 77 on punch 13 and counterparts of these elements similarly related to punch 12. Processing chamber 90 is provided within the core of reaction vessel, being located centrally thereof between the upper block assembly including lava plug 93 and alumina plug 94 and the assembly of this invention generally designated at 105. Thin graphite cylinder 81 and inner alumina cylinder 80, together with the thermocouples and the heater leads and the insulator tubes therefor, complete the assembly as previously described in reference to FIG. 6. The outer lava cylinder 79 of reaction vessel 77 is provided with a salt ring 130 located in an annular recess which extends longitudinally of the reaction vessel in the outer surface of the mid-portion of cylinder 79. Sodium chloride, silver chloride or other suitable salt or salt-like material having good flow properties is used for this purpose and the resulting annular salt body is subject to pressure developed in chamber 90 and to changes in the pressure therein. Another similar salt ring 132 is provided in an annular recess formed in lower gasket 20 and is located in a cooler part of the apparatus and overlaps the lower portion of salt ring 130 so that the pressures in rings 130 and 132 are essentially identical.

A wire 133 of manganin having a uniquely low temperature coefficient of electrical resistance is disposed within salt ring 132 which provides a relatively cool location for this pressure-sensing element. Manganin is preferred for the purpose, being of manganese-copper-nickel alloy which has a relatively high pressure coefficient of electrical resistance particularly in a preferred operating range of equipment of the type illustrated in FIG. 11. Leads of copper 134 and 135 are coupled to the manganin wire at junctions 137 and 138 and connected to a suitable constant source of electric current and to suitable conventional means (not shown) for measuring the voltage drop and changes in the voltage drop occurring in the manganin wire during the operation of the FIG. 11 equipment. A Chromel-Alumel thermocouple (not shown) is located in ring 132 and in contact with manganin wire 133. Leads (also not shown) from this thermocouple are brought out through gasket 20 after the manner previously described herein and are connected through an ice junction to a potentiometer enabling the operator to determine the temperature of wire 133 and to detect changes in the temperature of that wire during operation of the equipment.

A Chromel-Alumel thermocouple 140 is located in chamber 90 and connected by leads 141 and 142 to a potentiometer 144 outside the apparatus. Again, suitable copper leads joint the Chromel-Alumel elements to the potentiometer through an ice junction (not shown) and tubes 145 and 146 are provided for the purpose of taking the leads out of chamber 90 through nested cylinders 79, 80 and 81.

In the operation of the apparatus of FIG. 11, the resistance of manganin wire 133 under the desired operating conditions in chamber 90 is determined through the use of FIG. 9 equipment and elements 40 and 44 and operatively associated equipment as above described in detail. Thus, by selecting elements 40 and 44 in accordance with the operating conditions desired and particularly the temperature and pressure ranges within which the contents of chamber 90 are to be maintained, wire 133 may be calibrated for control, as indicated in FIG. 14. In FIG. 14, resistance of wire 133 in ohms is plotted against pressure in kilobars with Curve G resulting. As previously mentioned, the effect of temperature upon the resistance of wire 133 over the operating range of this invention apparatus may be considered negligible or correctable. Lines K and L represent maximum ΔT readings on the alpha to gamma phase transformations occurring first in element 40 and later in element 44. It will be understood that once the K–L region of Curve G has thus been established, the operating conditions within chamber 90 may be regulated so as to contain the resistance of wire 133 within that range as by relieving, to a small extent, the pressure applied by the belt apparatus to the reaction chamber or by correspondingly increasing that pressure when it appears to fall too low, as indicated by Curve G readings. Further, it will be understood that such regulation of operating conditions within the reaction vessel chamber may be accomplished manually by an operator following the course of the reaction chamber operation by observing continuous resistance measurements conducted on wire 132. Alternatively, this regulation may be accomplished automatically through apparatus operating in response to fluctuation in resistance along Curve G so as to maintain the resistance value within the predetermined range K–L, for example, by actuating belt control equipment to increase or decrease pressure within chamber 90. Similarly, this manual or automatic operation may be accomplished by adjusting the temperature within chamber 90 as by regulating or adjusting the heat source and as a further alternative, both temperature and pressure may be regulated if that is desired, the guidance for all these operations being the Curve G readings and the trends therein.

The temperature within chamber 90 and the trends of temperature changes therein may be measured by means of thermocouple 140 and potentiometer 144 until this thermocouple finally fails under the extreme conditions of the chamber 90 environment. Nevertheless, a reasonably close measure of the chamber 90 temperature can still be made throughout the period of the production operation through the use of thermocouple 61 and potentiometer 69. In other words, by observing the absolute temperature differential indicated by potentiometers 69 and 144 before thermocouple 140 fails, a correction factor may be developed which when applied to readings obtained at later stages of the operation from thermocouple 61 will enable close approximations of the actual temperature of the reaction mixture contained in chamber 90. Being thus guided, the operator (or automatic equipment performing the operator's function) can make adjustments in the electrical power supply to the resistance heating means, i.e., cylinder 81 to raise or lower the chamber 90 temperature.

In regard to the choice that may be made of the elements for 40 and 44 and the components thereof, FIG. 13 represents four different materials, each having a different pressure-temperature, alpha-gamma phase transformation characteristic. On the chart of FIG. 13, pressure in kilobars is plotted against temperature in degrees centigrade for pure iron (Curve M), iron—2% nickel (Curve N), iron—4% nickel (Curve O), and iron—7% nckel (Curve P). It will be understood that these are merely representative materials and that others may alternatively be used and that therefore the K–L range on Curve G of FIG. 14 may be relatively narrow or quite broad, depending on the requirements of the operation, and may also be displaced above or below the K–L range exemplified in FIG. 14.

The following illustrative, but not limiting, example of this invention in use in the monitoring of a simulated production operation is set forth to further inform those skilled in the art of the structural and operational details of this new apparatus and equipment incorporating it:

EXAMPLE

Referring to FIG. 11, chamber 90 is filled with alumina and the assembly 105 is put together for insertion into reaction vessel 77, parts 106 and 107 being of 100% iron while parts 108 and 109 are of 96% iron—4% nickel alloy. The FIG. 11 equipment is then assembled as illustrated, reaction vessel 77 and lower gasket assembly along with encased thermocouple lead wires being mounted on lower punch 13 of the press. Punch 13 is then raised to bring the lower gasket elements into engagement with belt 11. The upper gasket assembly along with the necessary thermocouple lead wires is next placed on the belt around the reaction vessel 77 and punch 13 is further raised along with belt 11 and the associated gasket components so that the upper gaskets come into contact with upper punch 12. Pressure in the hydraulic (oil) system driving the ram of the press is then developed and concurrently pressure is developed in vessel 77 and chamber 90 thereof. This hydraulic pressure is raised rapidly to 1000 p.s.i. gage, and is controlled to within ±2 p.s.i., gage by means of a Bristol van-type electronic pressure controller. Heat is then applied to the reaction vessel through graphite heater cylinder 81 and the temperature within the vessel is thereby brought slowly through the temperature range wherein the 96% iron—4% nickel alloy undergoes an alpha to gamma phase transformation. The temperature at the maximum point reached on the ΔT curve (FIG. 10) during this transformation is 669° C. while the temperature of the contents of chamber 90 at this stage is indicated by potentiometer 144 to be 725° C. The resistance of manganin wire 133 as indicated by the voltage drop across this wire at constant current is also read at this time. A 6-volt storage battery and a 30-ohm resistance provide a constant current of 0.200 ampere in wire 133 throughout this run for continuous readout of wire 133 resistance. Likewise throughout the run the temperature of wire 133 can be readily determined by means of a Chromel-Alumel thermocouple in salt ring 132 and in contact with the wire as previously described. The results of those determinations together with other data collected in this run are set forth in the following table:

*Table*

| Ram Hyd. (Oil) Press., p.s.i. (gage) | Temp., °C., of Trans. (max. on ΔT curve) | Press. (Kilobars) in Ch. 90 | Temp., °C., in Ch. 90 | Manganin Wire 133 w./200 amps. passing through it | | |
|---|---|---|---|---|---|---|
| | | | | Volt. Drop (Millivolt) | Ohm | T., °C. |
| 1,000 | Fe-Ni (96-4) =669 | 38 | 752 | 30 | 0.150 | 150 |
| 1,200 | Fe(100) =718 | 42 | 808 | 33 | 0.165 | 163 |

The ram hydraulic pressure is thereafter raised to 1200 p.s.i., gage, as indicated in the above table, and again a transformation is observed, occurring this time in the pure iron and at a temperature of 718° C., the contents of chamber 90 being at 808° C. Thus, ram hydraulic pressures of 1000 p.s.i. and 1200 p.s.i. are indicated as representing pressures within chamber 90 of 38 kb. and 42 kb., respectively.

It is also observed that the resistance of manganin wire 133 increases due to increases in pressure from 1000 p.s.i. (38 kb.) to 1200 p.s.i. (42 kb.) from 0.150 ohm to 0.165 ohm, a 10% rise. A simultaneous increase in the temperature of the wire from 150° C. to 163° C. results in approximately a 0.1% decrease in the resistance of the wire, requiring a correction of 0.1% to the 10% increase in resistance due to the increase in pressure applied to this wire. The change to pressure from 38 kb. accordingly mounts to 9.9% resistance change.

Having established the resistance values for wire 133 corresponding to the temperature and pressure conditions desired in chamber 90, it is possible to maintain chamber 90 for protracted periods under desired conditions. Specifically, it is only required to follow the changes occurring in resistance of wire 133 between 0.150 ohm and 0.165 ohm and the changes in thermocouple 140 to determine whether the conditions are stationary or moving in one direction or the other and adjustments may be made in ram hydraulic pressure and in electric power delivered to heater 81, or both, in order to maintain wire 133 within the indicated resistance range and the thermocouple in its required range.

Graphite heater cylinder 100 may be employed as an auxiliary heat source for elements 106, 107, 108 and 109 as for instance during the period when wire 133 is being pressure calibrated when it is desirable to maintain chamber 90 at a lower temperature level. Thus, if it is desired to establish a maximum process temperature of 600° C., the transformations at 669° C. and 718° C. can be achieved by applying heat to the phase transformation elements by means of cylinder 100. In this event manganin wire 133 somewhat cooler, possibly at a temperature of approximately 125° C. so that a correspondingly smaller correction for the effect of temperature on the resistance of the wire would be appropriate. At the end of the run, electric power to the heater elements of FIG. 11 is turned off and the hydraulic pressure on the ram of the press is then released, bringing the chamber rapidly back to atmosphere conditions. The assembling operation then is carried out essentially in reverse and the contents of chamber 90 are removed.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the specifically described embodiments of the invention may be made without departing from the scope of the invention as set forth in what is claimed.

What I claim as new and desire to secure by Letters Patent of the United States is:

1. Measuring and testing apparatus comprising a reaction vessel, means for establishing elevated pressures within the reaction vessel, a first elongated body disposed in the reaction vessel and being of material having a solid state phase transformation at elevated temperature and pressure, a second elongated body disposed in the reaction vessel and being of material different from that of the first body and having a solid-state phase transformation at elevated temperature and pressure, heating means associated with the vessel for establishing a higher temperature at one end of each body than at the other end thereof and thereby establishing heat flow lengthwise through both bodies and means for detecting a solid-state phase change in a predetermined portion of the first body, said detecting means including thermocouple means comprising a first thermocouple junction and a second thermocouple junction disposed adjacent to portions of the respective bodies and potentiometer means electrically connected to the thermocouple means for indicating difference temperature changes at the first thermocouple junction during solid-state phase transformations of the first body.

2. Measuring and testing apparatus comprising a reaction vessel providing a reaction chamber, means for establishing elevated pressures within the reaction chamber, a first elongated body disposed in the reaction vessel and being of material having a solid-state phase transformation at elevated temperature and pressure, a second elongated body disposed in the reaction vessel and being of material different from that of the first body, heating means for heating adjacent portions of the bodies to a temperature above the phase transformation temperature of the first body, and means for detecting a solid-state phase change in a predetermined portion of the first body removed from the heating means, said detecting means including thermocouple means comprising a first thermocouple junction and a second thermocouple junction disposed adjacent to corresponding portions of the respective bodies and means electrically connected to the thermocouple means for measuring differences in temperature between the said junctions.

3. Apparatus for measuring and testing comprising a first body of material having a solid-state phase transformation at elevated temperature and pressure, a second body disposed adjacent to the said first body and having a solid-state phase transformation under different temperature and pressure conditions, means for subjecting the said bodies to conditions causing a solid-state phase transformation to occur in a portion of the first body and to progress thru said first body, and means for detecting progression of the phase transformation thru the first body, said detecting means including thermocouple means comprising a first thermocouple junction and a second thermocouple junction disposed adjacent to portions of the respective bodies and potentiometer means electrically connected to the thermocouple means for indicating difference temperature changes at the first thermocouple junction during solid-state phase transformations of the first body.

4. Apparatus for measuring and testing comprising a first body of material having a solid-state phase transformation under predetermined pressure and temperature conditions, a second body of material having a solid-state phase transformation under different predetermined pressure and temperature conditions, first means for subjecting the first body to conditions causing a solid-state phase transformation to occur in said first body, second means for subjecting the second body to conditions causing solid-state phase transformation to occur in said second body and means for detecting progression of phase transformations through the said first and second bodies, said detecting means comprising a first thermocouple junction and a second thermocouple junction disposed adjacent to portions of the respective bodies and potentiometer means electrically connected to both said thermocouple means for indicating difference temperature changes at the thermocouple junctions during solid-state phase transformations of said bodies.

5. Apparatus for measuring and testing comprising a reaction vessel providing a reaction chamber, means for establishing elevated pressures within the reaction chamber, a first body disposed in the reaction vessel and being of material having a solid-state phase transformation under pressure and temperature conditions representing approximately the lower limit of predetermined pressure and temperature condition to be established in the reaction chamber, a second body in the reaction vessel and being of material having a solid-state phase transformation under pressure and temperature conditions representing approximately the upper limit of a predetermined pressure and temperature condition to be established in the reaction chamber, first heating means in the reaction vessel for causing a solid-state phase transformation to occur in said first body under predetermined reaction chamber conditions, second heating means in the reaction vessel for causing a solid-state phase transformation to occur in said second body under predetermined reaction chamber conditions, and means for detecting progression of phase transformations through the said first and second bodies.

6. Apparatus for measuring and testing comprising a reaction vessel providing high pressure-high temperature reaction chamber, a first body disposed in the reaction vessel adjacent to the reaction chamber and being of material having a solid-state phase transformation under pressure and temperature conditions representing approximately the lower limit of predetermined pressure and temperature condition to be established in the reaction chamber, a second body in the said vessel and adjacent to the first body and being of material having a solid state phase transformation under pressure and temperature conditions representing approximately the upper limit of a predetermined pressure and temperature condition to be established in the reaction chamber, first heating means in the reaction vessel for causing a solid-state phase transformation to occur in said first body under predetermined reaction chamber conditions, second heating means in the reaction vessel for causing a solid-state phase transformation to occur in said second body under predetermined reaction chamber conditions, means for detecting progression of phase transformations through the said first and second bodies, and reaction chamber control means for regulating the conditions within the reaction chamber between the upper and lower limits of pressure and temperature indicated by the said first and second bodies.

7. Apparatus for measuring and testing comprising a reaction vessel providing a reaction chamber, means for establishing elevated pressures within the reaction chamber, a first body disposed in the reaction vessel and being of material having a solid-state phase transformation under pressure and temperature conditions representing approximately the lower limit of predetermined pressure and temperature condition to be established in the reaction chamber, a second body disposed in the reaction vessel and being of material having a solid-state phase transformation under pressure and temperature conditions representing approximately the upper limit of a predetermined pressure and temperature condition to be established in the reaction chamber, first heating means in the reaction vessel for causing a solid-state phase transformation to occur in said first body under predetermined reaction chamber conditions, second heating means in the reaction vessel for causing a solid-state phase transformation to occur in said second body under predetermined reaction chamber conditions, means for detecting progression of phase transformations through the said first and second bodies, a third body of pressure-dependent electrical conductivity material subject to pressure changes within the reaction chamber, and means electrically connected to the third body to detect changes in electrical conductivity of said third body.

8. Apparatus for measuring and testing comprising a reaction vessel providing a reaction chamber, means for establishing elevated pressures within the reaction chamber, a first body disposed in the reaction vessel and adjacent to the reaction chamber and being of material having a solid-state phase transformation under pressure and temperature conditions representing approximately the lower limit of predetermined pressure and temperature condition to be established in the reaction chamber, a second body in the reaction vessel and adjacent to the first body and being of material having a solid-state phase transformation under pressure and temperature conditions representing approximately the upper limit of predetermined pressure and temperature condition to be established in the reaction chamber, first heating means in the reaction vessel for causing a solid-state phase transformation to occur in said first body under predetermined reaction chamber conditions, second heating means in the reaction vessel for causing a solid-state phase transformation to occur in said second body under predetermined reaction chamber conditions, means for detecting progression of phase transformations through the said first and second bodies, a wire of material in which electrical conductivity varies with changes in pressure disposed partially around the reaction vessel and subject to pressure changes within the reaction vessel, and means including a constant electrical potential source connected to the wire for detecting changes in electrical resistance of said wire.

References Cited in the file of this patent
UNITED STATES PATENTS
2,718,538     Wyatt _____ Sept. 20, 1955

OTHER REFERENCES

Metallography and Heat Treatment of Iron and Steel, 4th edition, by Sauveur, pages 102 to 103.